United States Patent [19]

Santy et al.

[11] 4,083,529
[45] Apr. 11, 1978

[54] BUTTERFLY VALVE

[75] Inventors: Jean Santy; Etienne Hochain; André Schneider, all of Pont-a-Mousson, France

[73] Assignee: Pont-a-Mousson S.A., Nancy, France

[21] Appl. No.: 637,437

[22] Filed: Dec. 3, 1975

[30] Foreign Application Priority Data

Dec. 5, 1974 France .............................. 74 39862
Nov. 7, 1975 France .............................. 75 34060

[51] Int. Cl.$^2$ .......................................... F16K 25/00
[52] U.S. Cl. .................................. 251/175; 251/173; 251/306
[58] Field of Search ....................... 251/173, 306, 175

[56] References Cited

U.S. PATENT DOCUMENTS

| 2,978,222 | 4/1961 | Henrion | 251/173 |
| 3,394,914 | 7/1968 | Nagasato | 251/173 |
| 3,409,269 | 11/1968 | Fawkes | 251/173 X |
| 3,550,905 | 12/1970 | Sifford | 251/173 X |
| 3,563,510 | 2/1971 | Priese | 251/173 |

FOREIGN PATENT DOCUMENTS 1,203,029  8/1970  United Kingdom ................. 251/173

Primary Examiner—Harold W. Weakley
Attorney, Agent, or Firm—Sughrue, Rothwell, Mion, Zinn and Macpeak

[57] ABSTRACT

The valve closure element has an annular peripheral groove opening outwardly onto the periphery of the closure element. An annular sealing element has an annular heel portion disposed in the groove. The latter has an inner end face whose diameter is less than the inside diameter of the heel portion. The groove is defined laterally by two confronting annular faces of the closure element which have a substantially rectilinear generatrix and grip the heel portion so as to prevent relative movement of the heel portion and closure element.

5 Claims, 15 Drawing Figures

FIG._4
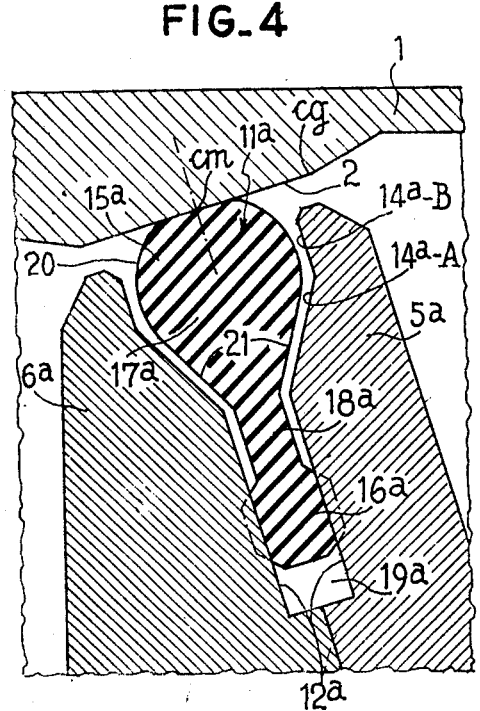
FIG._5
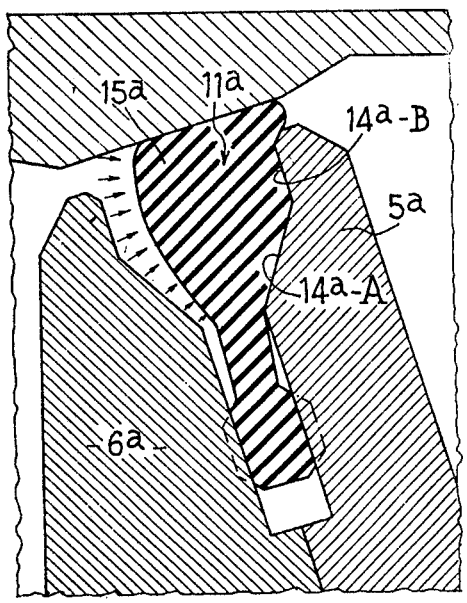
FIG._6
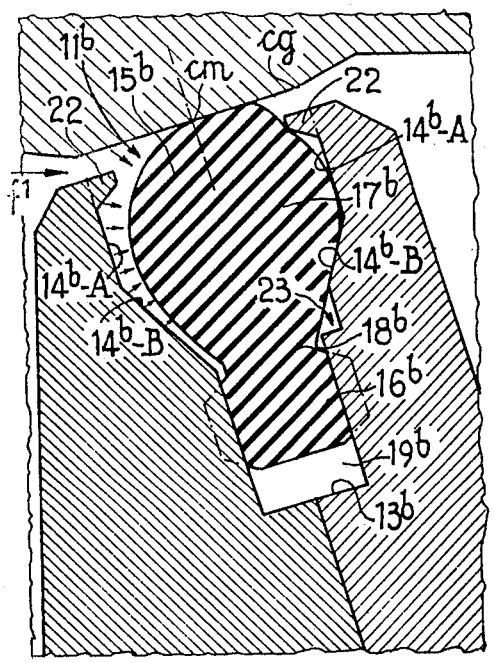
FIG._7
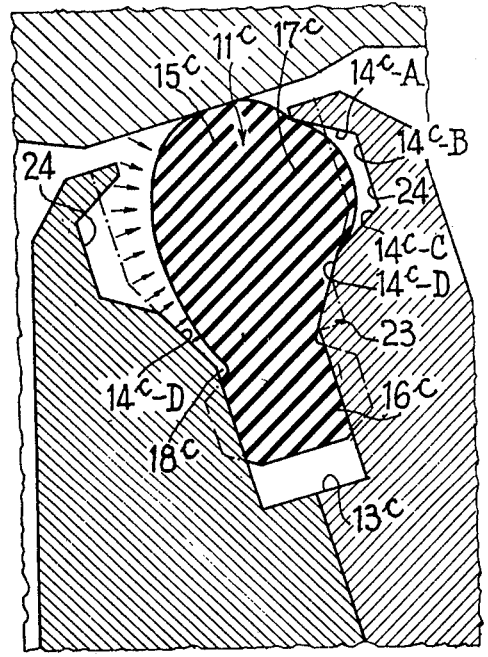

FIG_10
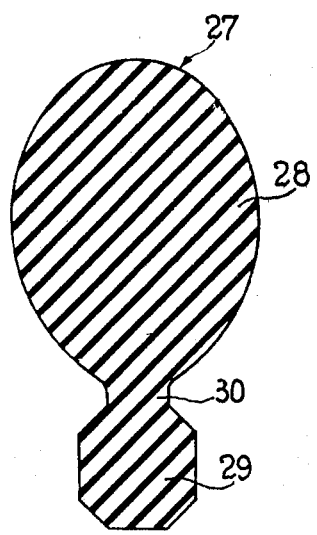
FIG_11
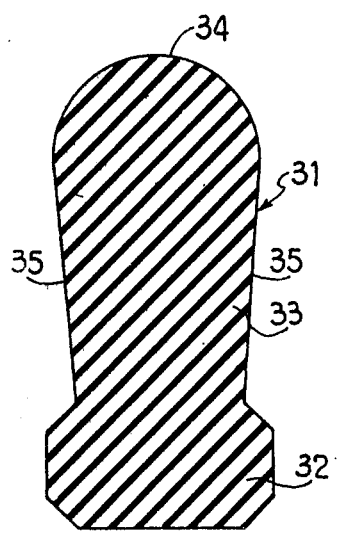
FIG_12
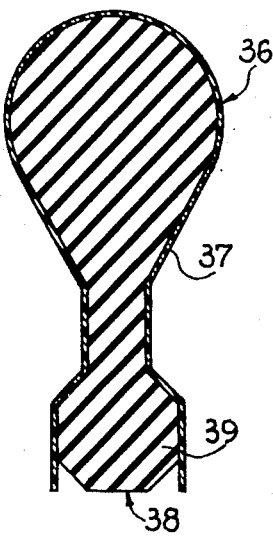
FIG_13
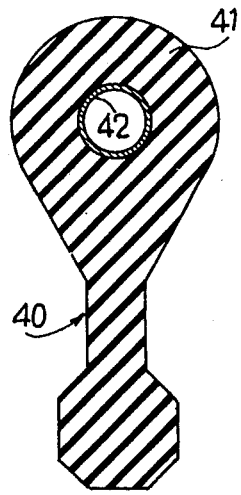

BUTTERFLY VALVE

The present invention relates to a valve of the type comprising a sealing element whose heel portion is trapped in an annular groove which opens onto the periphery of the valve closure element.

Valves of this type are known in which the sealing element has three annular integral portions, namely a heel portion, a head portion, adapted to cooperate with the seat of the valve and projecting from the groove of the closure element, and a web portion connecting the heel and head portions. In this valve, the heel portion has a rectangular section to which shape the shape of the annular groove receiving it is closely adapted, the sealing in the region of the heel portion of the sealing element being ensured by the fact that this heel portion is clamped by its inner peripheral surface against the inner end of the groove receiving it. The heel portion of the sealing element is thus applied on the major part of its faces against the walls of the groove and it is impossible to take up any possible defect in centering of the inner end of the groove. In other words, the sealing element is positioned by its heel portion, and to obtain a good peripheral contact with the body of the valve and consequently a good seal, the groove receiving the sealing element must be perfectly centered on the axis of the closure element. This good contact is difficult to achieve, in particular in the use of the valve at a low differential pressure.

An object of the invention is to provide a valve which does not have these drawbacks. Another object of the invention is to provide a valve whose sealing element has flow or creep phenomena which are natural or due to low temperature and therefore a valve which may be employed for fluids whose temperature is close to the maximum allowable temperatures for the material of the sealing element (200°–300° C for an elastomer). As the aforementioned flow phenomena are related to the state of stresses to which the sealing element is subjected the creep will be as small as the stresses are small. An object of the invention is to provide a sealing element which is employed under small stresses.

According to the invention, there is provided a valve comprising a sealing element whose heel portion is trapped in an annular groove opening onto the periphery of the valve closure element and having an inner end whose diameter is less than the inside diameter of the sealing element, wherein the heel portion is clamped and held stationary between two confronting annular faces of the closure element each having a substantially rectilinear generatrix and laterally defining said groove so as to prevent any relative movement of the heel portion with respect to the faces of the groove between which faces it is clamped.

By means of these features, the sealing element is retained only by the lateral faces of its heel portion which therefore remains disengaged from the inner end of the annular groove so that, upon its assembly, it can be positioned by bearing against the inner face of the seat of the valve and not against the inner end of the groove. Consequently, it is possible to take up any possible defects in the centering of the groove with respect to the axis of the closure element, the sealing element always being in good sealing contact with the seat when the valve is closed.

Another drawback of known valves resides in the fact that the head of the sealing element has a trapezoidal section so that its zone of contact with the seat of the valve is relatively large, even in the absence of a differential pressure of the fluid in the piping in which the valve is inserted. This may be the cause of a high closing torque and a premature wear. Moreover, owing to the trapezoidal shape of the head portion, the connection between the latter and the intermediate web portion of the sealing element has an angle which may cause splitting and tearing of the material of the sealing element (elastomer for example) when the latter is subjected to stresses due to the clamping and to the action of the pressure of the fluid.

According to another feature of the invention which more particularly aims at eliminating this drawback, the sealing element comprising a head portion connected to the heel portion by an annular web portion, the head portion has at least partly a concave curvilinear section closed on said web portion.

Further features of the invention will be apparent from the ensuing description with reference to the accompanying drawings which are given merely by way of example.

In the drawings:

FIGS. 4 and 5 are partial axial sectional views, to an enlarged scale, of another embodiment of the invention applied to a valve of the type shown in FIG. 1 respectively in the absence and in the presence of a differential pressure;

FIGS. 6 and 7 are views similar to FIGS. 4 and 5 of two other embodiments of the invention applied to a valve of the type shown in FIG. 1;

FIGS. 10 and 13 show various possible sections of a sealing element of use in the valve according to the invention;

Figure 1:
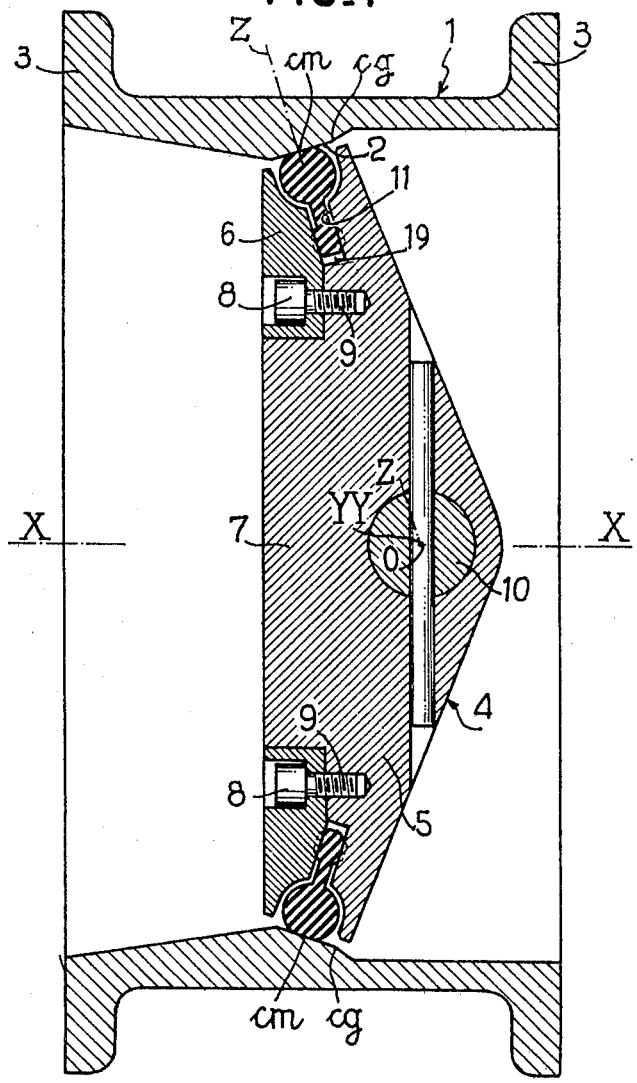
FIG. 1 is an axial sectional view of a valve which is a butterfly valve improved in accordance with the invention.
Figure 2:
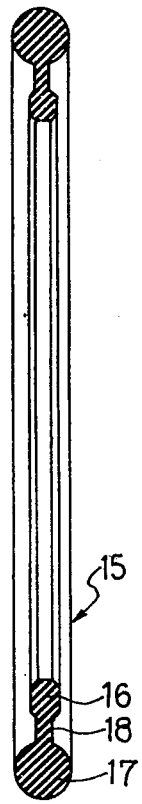
FIG. 2 is an axial sectional view of a sealing element employed in the valve shown in FIG. 1.
Figure 3:
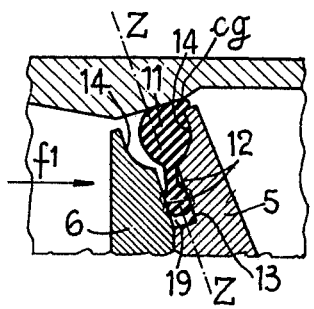
FIG. 3 is a partial axial sectional view of the valve shown in FIG. 1 when subjected to a differential pressure.

In the embodiment shown in FIGS. 1-3, the valve according to the invention of the type comprising a body of revolution 1 having an axis X—X in which there is formed a valve seat 2 of frustoconical shape whose axis coincides with the axis X—X. The valve body 1 is provided on each side with fixing flanges whereby it is possible to insert the valve in a fluid piping (not shown).

A closure element, or rotary butterfly valve element, 4 is mounted in the valve body 1. It comprises a part 5 having the general shape of a disc and a clamping ring 6 concentric with the disc 5 and mounted around a circular projection 7 which projects from the general plane of the disc 5. The ring 6 is fixed to the latter by screws 8 which are engaged in axially extending tapped holes 9 formed in the disc 5 and equally spaced around the projection 7.

The disc 5 is keyed to a rotary shaft 10 having an axis Y—Y perpendicular to the axis X—X and intersecting the latter at 0. The axis Y—Y of the butterfly valve element is offset in that it is not in the transverse plane of closure of the valve defined by the median circumference $cm$ of the seat 2, but is offset from this plane in the direction of the larger circumference $cg$ of the seat 2.

The disc 5 and the ring 6 define therebetween an annular peripheral groove 11 whose section has the general shape of a calix, the axis Z—Z of this section being normal to the face of the seat 2 and passing through the point 0. This groove thus has an inner part having annular frustoconical faces 12 and an end face 13 which is also frustoconical and annular and normal to the faces 12. It also has an outer part which is divergent toward the periphery of the butterfly valve element. In the presently-described embodiment, this outer part is defined by annular lateral faces 14 whose section is formed by a segment of a circumference.

The groove 11 receives a sealing element 15, for example of elastomer material, which is shown in the free state in FIG. 2. In this state, this sealing element is planar and comprises three portions which are integral with each other, namely a heel portion 16, a head portion 17 and a web portion 18 interconnecting the head and heal portions.

The heel portion 16 has a thickness which distinctly exceeds the width of the groove 11. Further, its inside diameter exceeds the diameter of the annular inner face 13 of the groove 11 so that the sealing element 15, after having been assembled with the butterfly valve element, is spaced from the inner face 13 of the groove 11 and defines an annular chamber 19.

As concerns the web portion 18, it can be seen that it has a thickness slightly less than the distance between the faces 12, whereas the head portion 17, which has a convex curvilinear section connected to the web portion 18 and is here a circular section, is spaced from the curvilinear lateral faces 14 of the outer part of the groove 11. Moreover, the head portion 17 extends out of the periphery of the butterfly valve element so as to be capable of coming in contact with the seat 2 of the valve body in the closing position of the butterfly valve element.

This butterfly valve operates in the following manner:

Bearing in mind that the thickness of the heel portion 16 distinctly exceeds the width of the inner part of the groove 11, the sealing element 15 is maintained in position by the clamping of the heel portion 16 between the confronting faces 12 respectively formed on the disc 5 and ring 6. This clamping affords a seal in this region of the sealing element with respect to the body of the butterfly valve element and not in the region of the inner surface of the heel portion and the inner end of the groove as in the prior art. Consequently, it is unnecessary to adapt the diameter of this surface to the diameter of the inner end of the groove and this constitutes a considerable advantage of the arrangement according to the invention.

In FIG. 1, the valve has been shown in its closed position and in the absence of a differential pressure of the fluid on each side of the butterfly valve element. Under these conditions, only the head portion 17 is slightly deformed owing to the fact that it is put in contact with the seat 2. Moreover, the clamping stresses are only exerted on the heel portion in the direction for compressing it so that the whole of the sealing element is subjected to only very low stresses which would be liable to have an adverse effect on its performance.

In FIG. 3, it is assumed that the valve is subjected to a differential pressure exerted in the direction of arrow $f^1$. In this case, the sealing element is deformed as shown, that is to say the head portion 17 and the web portion 18 are urged by the pressure toward the downstream side of the groove 11 (here corresponding to the circumference $cg$ of the seat 2). There is consequently a contact between the head portion and the downstream face 14 and an application against the seat 2, the forces applying the sealing element against the seat being the greater as the pressure is higher. It can be seen in this case that the seal is achieved on a considerable area, which notably improves the sealing qualities of the valve.

Thus it can be seen that the design of the sealing element 15 ensures a good seal, whether the differential pressure be low, absent or, on the contrary, high.

Owing to the absence of stresses on the sealing element it may be employed with fluids whose temperature is close to the maximum allowable temperatures for the material of the sealing element. In respect of an elastomer, this temperature may be between 200° and 300° C. Moreover, the number of operations of the valve may be extremely high. The flow or creep phenomena which are natural or due to the temperature of the fluid related to the state of low stresses, are substantially reduced. Ease of assembly and centering of the sealing element may also be mentioned.

FIGS. 4 and 5 show another embodiment of the invention concerning in particular an improvement in the flattening of the head portion $17^a$ in the presence of a differential pressure while guaranteeing a good seal in the absence of differential pressure. In this case, the section of the head portion $17^a$ of the sealing element $15^a$ has, in the free state (not shown), a convex curvilinear segment 20 which joins the lateral faces of the web portion $18^a$ through two straight segments 21. Also, the outer part of the groove $11^a$ is defined by two frustoconical faces $14^a$-A and $14^a$-B which are inclined with respect to each other and are connected to the faces $12^a$ of the inner part of the groove.

FIG. 5 shows more clearly that, in the presence of a differential pressure, the head portion of the sealing element is closely applied against the two faces $14^a$-A and $14^a$-B and thus increases the sealing quality of the valve.

FIG. 6 shows another embodiment of the invention in which the head portion $17^b$ of the sealing element $15^b$ has a shape which is more massive than in the foregoing embodiments in that the web portion $18^b$ is reduced practically to a constricted region of the sealing element $15^b$. In this case, the groove $11^b$ has on its periphery two annular flanges 22 which project from the lateral walls of the outer part of the groove $11^b$. These walls are here defined by two frustoconical faces $14^b$-A and $14^b$-B which are inclined with respect to each other, the wall adjacent the larger circumference $cg$ of the seat 2 also having an annular groove 23 defined by two surfaces perpendicular to each other, one of which is parallel to the inner end face $13^b$ of the groove $11^b$.

In this embodiment, the sealing element $15^b$ is much more massive and it therefore has an increased strength when it is subjected to high differential pressures owing to the larger volume of elastic material. The flanges 22 permit a limitation of the danger of expulsion of the sealing element $15^b$ under high pressure and decrease the formation of a bulge which could be disadvantageous in respect of use of the valve with fluid flow conditions having severe parameters, such as high pressure and high temperature.

In this embodiment the deformation of the sealing element $15^b$ occurs in a more radial direction. The danger of a wedging of the sealing element is also diminished. With regard to the groove 23, it also serves to diminish the danger of wedging of the sealing element by decreasing the surface of contact between the outer surface of the sealing element and the wall against which it is applied in the presence of a differential pressure which is exerted in the direction of arrow $f^1$.

FIG. 7 shows another embodiment in which the sealing element $15^c$ is identical to the sealing element $15^b$ shown in FIG. 6. However, in this case, the outer part of the groove $11^c$ has walls in which there are provided respectively a recess 24 having a substantially trapezoidal section defined by three annular faces $14^c$-A, $14^c$-B and $14^c$-C which join, inwardly of the groove, a face $14^c$-D. The face $14^c$-D is adjacent the circumference $cg$ of the seat 2 and may have an annular recess 23 similar to that of embodiment shown in FIG. 6.

The annular recesses 24 increase the effect of the projecting portions 22 shown in FIG. 6 and permit the obtainment of a sealing element which is much more anchored (in the deformed state) inside the groove $11^c$. The risk of expulsion is therefore still further reduced.

The modification shown in FIG. 7 enables taking up possible deformations or displacements of the butterfly valve element with respect to its axis (due for example to the effect of temperature, wear of the rotary spindle, forces to which the rotary spindle is subjected etc.) by providing a recess 24 in which the deformed parts of the sealing element may be disposed for the aforementioned reasons and thus as it were accomodated.

Figure 8:
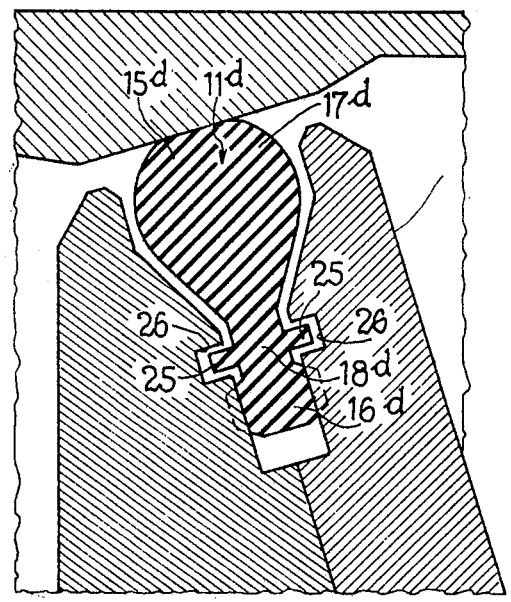
FIG. 8 is a partial axial sectional view of a modification of the sealing element of the valve according to the invention.

The web portion $18^d$ of the sealing element $15^d$ comprises in the embodiment shown in FIG. 8 two annular retaining beads 25 which extend on each side of the web portion $18^d$. These beads are engaged in complementary annular recesses 26 of much larger dimensions formed in the lateral walls of the groove $11^d$.

Owing to the beads 25 cooperating with the recesses 26 there is less tendency on the part of the sealing element $11^d$ to be expelled when the sealing element is subjected to a differential fluid pressure in the piping. There is achieved a hooking of the sealing element in the region of the web portion $18^d$ by the action of the beads 25. The pulling force on the heel portion $16^d$ is thus limited. This embodiment has a particular advantage when the closure element is in positions close to its closing position. Indeed, in such positions, the fluid flows through a reduced section of passage at high velocity and a "laminating" phenomenon occurs and the sealing element is put under high stress.

Figure 9:
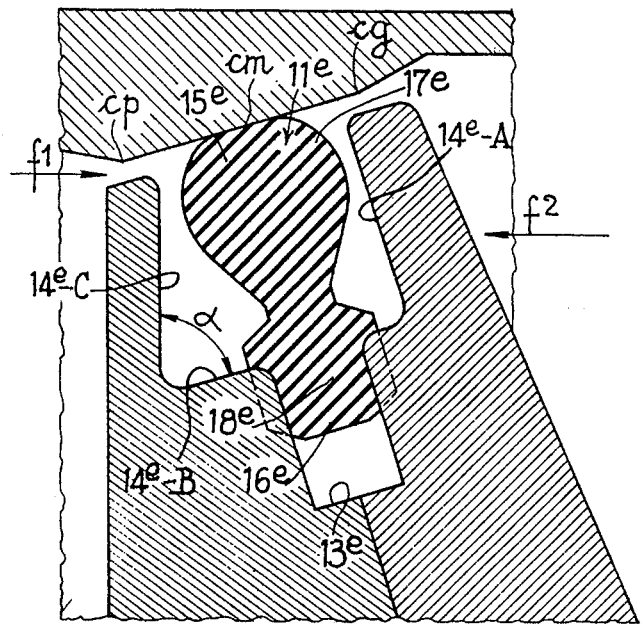
FIG. 9 is a partial axial sectional view of another embodiment of the invention.

The embodiment shown in FIG. 9 constitutes a compromise between the embodiments shown in FIGS. 6 and 7. In this case, the sealing element $15^e$ is identical to that shown in these Figures whereas the outer part of the groove $11^e$ has a frustoconical face $14^e$-A adjacent the larger circumference $cg$ of the seat 2, whereas there is provided adjacent the smaller circumference $cp$ an annular recess defined by a first annular face $14^e$-B parallel to the inner face $13^e$ of the groove $11^e$ connected to an annular face $14^e$-C which makes with the face $14^e$-B an acute angle $\alpha$, the groove $15^e$ thus diminishing in width in the outward direction.

It has been found that, in practice, for a valve according to the embodiment shown in FIG. 9, although the direction of application of the differential pressure is preferential in the direction of arrow $f^1$, this valve may also be employed with an opposite differential pressure direction (arrow $f^2$) while also conserving good sealing and operating torque conditions.

It will also be observed that in this embodiment the heel portion $18^e$ of the sealing element does not completely engage in the inner part (having the parallel faces) of the groove $11^e$, which shows that it is possible to employ, with a closure element of given dimensions, sealing elements of different diameters or, vice-versa, the clamping of the sealing element occurring on the lateral faces of the heel portion.

FIGS. 10–13 show several possible modifications of the sealing element according to the invention.

The sealing element 27 shown in FIG. 10 comprises a head portion 28 of elliptical section which is connected to the heel portion 29 by a constricted region 30 similar to a web portion.

FIG. 11 shows a sealing element 31 whose heel portion 32 is directly connected to the head portion 33 whose section is partly curvilinear at 34 and is connected to the heel portion by straight portions 35.

The embodiments shown in FIGS. 10 and 11 are stronger than the foregoing embodiments and employ a larger mass of elastic material such as an elastomer. These two sealing element modifications are particularly suitable for valves equipping large-diameter pipings.

The sealing element 36 shown in FIG. 12, whose general shape corresponds to that of the sealing element shown in FIGS. 4–7, is covered with a protective layer 37 except for the inner surface 38 of the heel portion 39. The protective material may be constituted by a thin layer of polytetrafluoroethylene or some other like material. This protective layer permits a considerable reduction in the forces due to friction of the sealing element against the seat of the valve and consequently the actuating torque and a reduction in the wear of the sealing element. This embodiment is moreover particularly adaptable to valves in piping having agressive fluids.

The embodiment shown in FIG. 13 concerns a sealing element 40 identical to that shown in FIGS. 4–7 in which the head portion 41 is provided in its centre part with a hollow ring or core 42. This core has an annular shape and may be of metal or other material and is advantageously constituted by an elastically yieldable element such as an annular spring. This core 42 permits limiting the tendency on the part of the sealing element 40 to be expelled from its groove. This feature is very important in the case where the sealing element is subjected to great force, for example in the position of the closure element corresponding to a laminar flow mentioned hereinbefore.

The embodiments of the invention described heretofore all relate to a valve of the butterfly valve type. However, the invention is not limited to this type of valve. It has indeed been found that the arrangement of the sealing device, namely in particular the mounting of the sealing element in the body of the closure element, may be applied not only to the example of butterfly valves but also to valves having a plate-type closure element with the same advantages.

Figure 14:
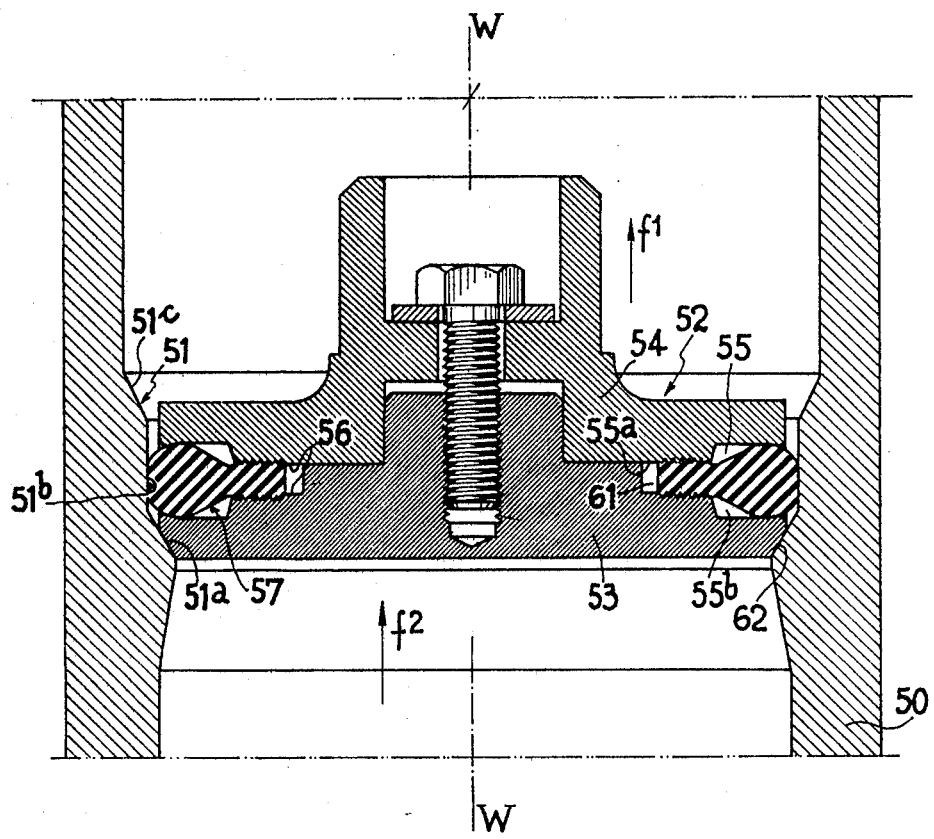
FIG. 14 is an axial sectional view of a valve of the type having a disc in which the features of the invention are incorporated.
Figure 15:
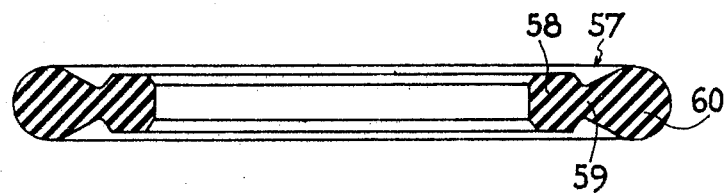
FIG. 15 is an axial sectional view of the sealing element employed in the valve shown in FIG. 14.

Consequently, in the embodiment shown in FIGS. 14 and 15, the valve according to the invention is of the type having a plate-type closure element and comprises a valve body 50 having an axis W—W in which there is formed a seat 51 comprising three annular surfaces 51$^a$, 51$^b$ and 51$^c$ which are, respectively, in the direction of the opening of the valve: a frustoconical surface, a cylindrical surface and a frustoconical surface, the two frustoconical surfaces being divergent in the direction f$^1$ for opening the valve.

The latter has a closure element 52 comprising a disc 53 and a clamping ring 54 coaxial with the axis W—W and rendered integral with each other by a central screw screwed in a tapped hole formed in the disc 53. The ring 54 has means (not shown) for coupling the closure element to an actuating device which permits selectively raising it off and moving it toward its seat 51.

The disc 53 is stepped, as is also the corresponding surface of the ring 54, so that the two elements define therebetween an annular groove 55 having a narrow inner part 55$^a$ and a wider outer part 55$^b$, it being understood that this groove may have any of the sectional shapes described hereinbefore. The confronting faces 56 of the inner part 55$^a$ of the groove are preferably ribbed. The groove 55 receives an annular sealing element 57 (FIG. 15) in a position which is centered with respect to the axis W—W, the element 57 having a heel portion 58, an intermediate web portion 59 and an outer bead or head portion 60. The sealing element is in other respects identical to that described hereinbefore, it being understood that all the illustrated modifications may be employed in the valve shown in FIGS. 14 and 15. The ribs of the faces 56 increase the retention of the heel portion 58 after the mounting of the sealing element and in particular after the tightening of the screw. It will be observed that the inside diameter of the sealing element 57 exceeds the diameter of the inner end of the groove 55 so that any required centering of the sealing element is possible upon assembly. There therefore remains after assembly an annular chamber 61 between the inner face of the sealing element and the inner end of the groove 55. As shown in FIG. 14, the sealing element 57 cooperates with the cylindral surface 51$^b$ of the seat 51 when the valve is closed. In this position, a frustoconical chamfered surface 62, provided on the disc 63 on the side of the disc opposed to the groove 55, bears against the frustoconical surface 51$^a$ whose inclination or apex angle is adapted thereto.

The fluid flows preferably in the direction of arrow f$^2$, but a flow in the opposite direction may also be envisaged.

Note that in all the described embodiments, as the sealing element is in major part located inside the groove, only the relatively small part thereof which extends out of the groove is exposed to the fluid flow. This is advantageous in the case where the fluid is capable of attacking or adversely affecting the sealing element.

Having now described our invention what we claim as new and desire to secure by Letters Patent is:

1. In a valve comprising an annular seat, a valve closure element cooperative with the seat and defining a peripheral annular groove which opens outwardly onto the periphery of the closure element and has an annular inner end face and a radially inner part and a radially outer part, and an elastomer sealing element having an annular head portion for contacting the seat in a valve-closing position of the closure element and a heel portion, the heel portion being disposed in said inner part of the groove; the improvement comprising in combination a first annular gap which is defined between said heel portion and said inner end face of the groove and extends throughout the width of said inner part of said groove, an intermediate portion connecting the head portion to the heel portion of the sealing element and defining a constricted portion in a free state of the sealing element before assembly of the sealing element with the valve closure element, two first confronting annular faces of said inner part of the groove which have a substantially rectilinear generatrix and are in gripping relation to the sealing element in a part of the sealing element consisting of the heel portion and excluding the intermediate portion whereby to prevent relative movement between the heel portion and the two first confronting faces but allow the head portion and intermediate portion freedom of movement and also allow the intermediate portion to be exposed to pressure of fluid controlled by the valve, the sealing element having in a free state and before assembly of the sealing element with the closure element a cross-sectional shape which is such that said head portion has, in a radially outer part of said head portion, a curvilinear convex contour which extends to a region of said head portion of maximum width and, in a radially inner part of said head portion, a contour defined by two contour lines which progressively converge in a direction toward said heel portion and terminate in said intermediate portion, said outer part of the groove being laterally defined by two second annular confronting faces which are radially inwardly divergent from each other and define with respective confronting faces surfaces of the interposed sealing element in a part of the sealing element consisting of the head portion and the intermediate portion a second annular gap on each side of the sealing element, each of said second gaps increasing in width in a direction radially inwardly from said region of maximum width of the head portion to said intermediate portion, a first annular surface substantially parallel to said seat in a valve-closing position of said closure element being connected to a radially inner end of one of said second confronting faces, said one second confronting face extending from said first annular surface at an acute angle, a second annular surface substantially parallel to said seat in a valve-closing position of said closure element being connected to a radially inner end of the other of said second confronting faces, said other second confronting face extending from said second annular surface at an angle of substantially 90°.

2. A valve as claimed in claim 1, wherein the seat has a frustoconical shape, and said one second confronting face is provided on a side of said sealing element which is adjacent a smaller circumference of the seat.

3. A valve as claimed in claim 2, wherein said closure element is a butterfly closure element and is mounted on a rotary shaft having an axis which is offset with respect to a transverse plane passing through a median circumference of said seat and corresponding to a closure plane of the closure element, and a center line of the cross section of the heel portion of the sealing element is a generatrix of a cone whose apex angle is located on the point of intersection of the axis of the tubular body of the valve and the axis of said rotary shaft.

4. A valve as claimed in claim 1, wherein said intermediate portion is an annular web portion .

5. A valve as claimed in claim 1, of the butterfly valve type having a tubular body having an axis, wherein the closure element is a butterfly closure element disposed when in a valve-closing position at 90° to the axis of the tubular body.

* * * * *